Nov. 6, 1956  M. H. DOCKEN  2,769,635
REVOLVING TEETER-TOTTER
Filed Aug. 14, 1953
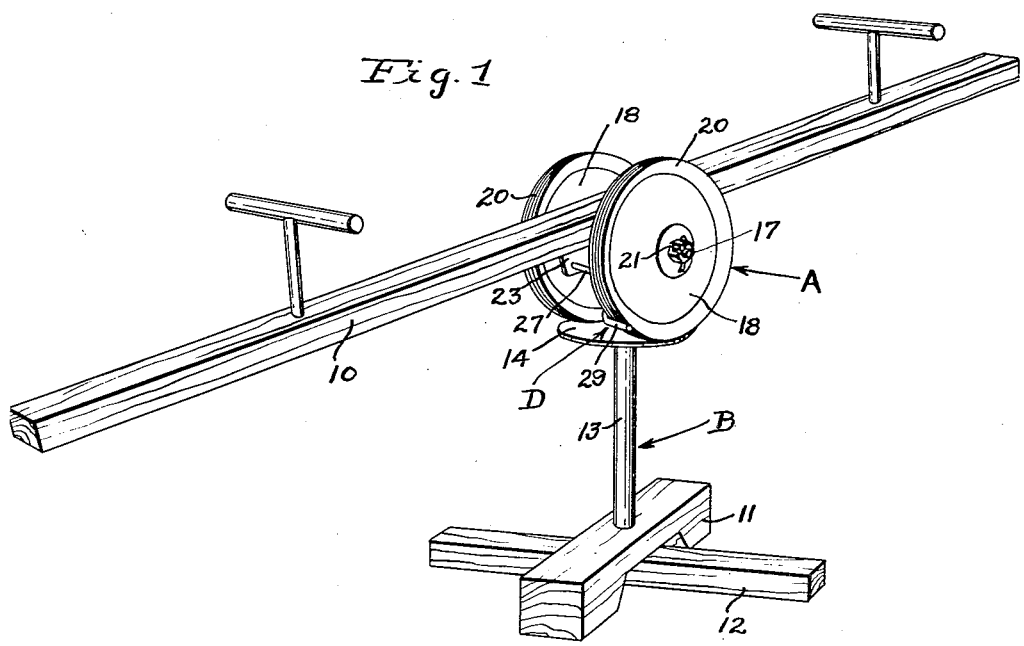
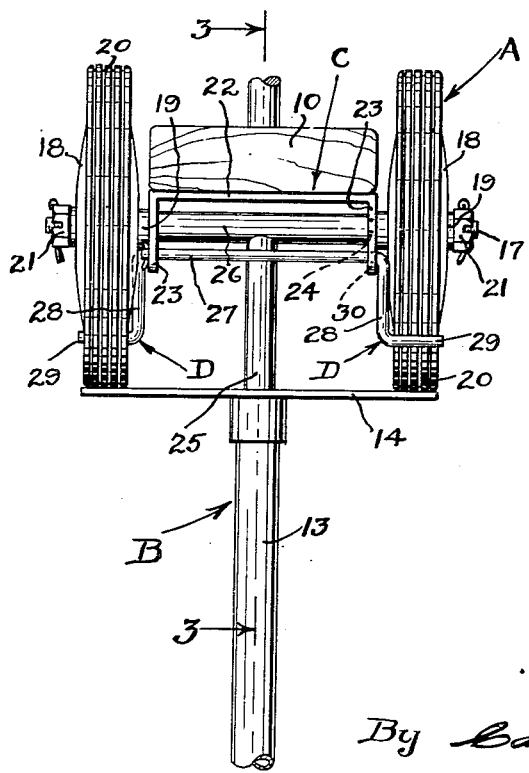
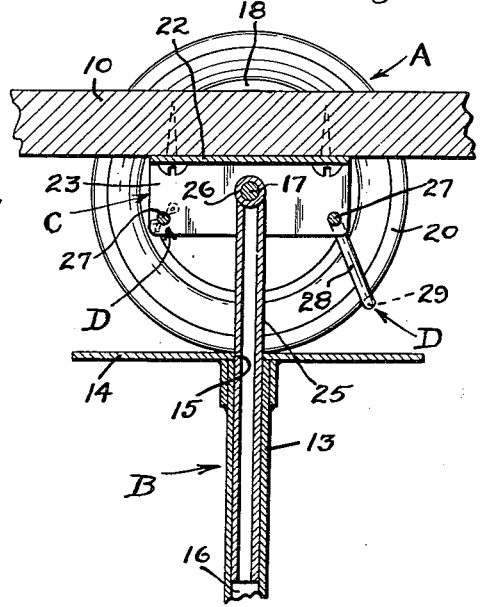
Inventor
Melford H. Docken
By Caswell & Lagaard
Attys.

United States Patent Office 2,769,635
Patented Nov. 6, 1956

2,769,635

REVOLVING TEETER-TOTTER

Melford H. Docken, Northfield, Minn.

Application August 14, 1953, Serial No. 374,314

4 Claims. (Cl. 272—30)

My invention relates to revolving teeter-totters in which a swiveling movement of a teeter-totter is automatically imparted thereto upon the reciprocation thereof.

An object of the invention is to provide a device of the instant nature which is of exceedingly simple, durable and inexpensive construction and which may be readily used by and for the enjoyment of children.

In accomplishment of the ends aforesaid, I provide a carriage comprising an axle shaft and a pair of supporting wheels mounted thereon, said wheels having treads, preferably of rubber. A fulcrum mounting supported on the axle shaft, in turn, supports a teeter board. The wheels of the carriage run in a circular path on a platform member, carriage guiding means being provided which directs the carriage swively relative to said platform member. Each carriage wheel has a dog therefor, the two dogs being pivotally hung from the fulcrum mounting. Each dog has a terminal lug under-reaching the lower rear quarter of its respective carriage wheel, such terminal lug extending transversely of the tread of its respective wheel in near proximity thereto. The terminal lug of each dog engages frictionally the tread of its respective wheel upon tilting movement of the fulcrum mounting in direction elevating the dog. This engagement of lug with tread causes the wheel to turn a step forward in its circular path on the platform member. Thus, alternate forward steps of the two wheels cause the carriage to turn swively step by step, thereby rotating the teeter board as it is tilted by the occupants thereof.

Other objects of the invention reside in the novel combination and arrangement of parts and in the details of construction hereinafter illustrated and/or described.

In the accompanying drawing,

Fig. 1 is a perspective view of a revolving teeter-totter constructed in accordance with my invention;

Fig. 2 is a fragmentary elevational view of the structure shown in Fig. 1 and as seen from one end of the teeter board, and Fig. 3 is a sectional view taken as on the line 3—3 of Fig. 2.

Reference being had to the drawing, it will be seen that the embodiment of my invention shown therein includes a carriage A, a teeter board 10 supported by the carriage, and a carriage support B, in turn, supporting said carriage.

The carriage support B consists of a pair of crossed baserails 11, 12, a tubular post 13 upstanding from said base-rails, and a disc-like platform member 14 welded to or otherwise suitably secured to said post 13 at the upper end thereof. The platform member 14 has a central opening 15 therein registering with the bore 16 of said post 13.

The carriage A includes an axle shaft 17 and a pair of supporting wheels 18 mounted thereon. These wheels, of well known conventional type, have ball-mounted hub-sleeves 19 at the centers thereof and are fitted with tires or treads 20 of rubber. Nuts 21 screwed on the terminal portions of the axle shaft 17 constitute end stops for the carriage wheels 18 and limit the relative spreading thereof on said shaft.

The teeter-board 10 is mounted intermediately thereof on a fulcrum mounting C which, in turn, is supported by the axle shaft 17 between the wheels 18 thereon. Said fulcrum mounting C consists of a relatively short length of channel iron, the same including a web 22 and flanges 23 depending therefrom. These flanges 23, midlength thereof, have aligned holes 24 therein which receive the axle shaft 17. Each flange 23 is in abutting relationship with respect to the inner end of the hub-sleeve 19 of its adjacent wheel 18, thereby resolving the fulcrum mounting C into a spacer element for the two wheels 18.

The carriage wheels 18 ride on the platform member 14 and travel in a circular path thereon under guidance of means which directs the carriage swively with respect to the carriage support B. Said carriage guiding means consists of an upright guide spindle 25 revolubly socketed in the opening 15 in the platform member 14 and in the bore 16 of the post 13 of the carriage support B. The upper end of the guide spindle 25 is welded or otherwise suitably secured to a sleeve 26 midlength thereof. This sleeve 26 encircles the axle shaft 17 of the carriage A and the ends of said sleeve 26 oppositely abut against the opposite flanges 23 of the fulcrum mounting C. Due to said noted construction and arrangement of spindle 25 and sleeve 26, the carriage guiding means constituted thereby, confines the carriage A to movement swively relative to the carriage support B with the wheels 18 of said carriage running in a circular path on the platform member 14.

As the teeter-board 10 is reciprocated by its occupants, the carriage A is caused to turn swively on the platform member 14 step by step. This movement of the carriage is brought about by simple and effective means consisting of a pair of crank-shaped dogs D, there being one such dog for each of the two carriage wheels 18. Each dog D has a shaft portion 27, an arm 28 branching therefrom, and a terminal lug 29 at the end of said arm. The shaft portion 27 of the two dogs D are pivotally mounted at opposite ends of the flanges 23 of the fulcrum mounting C, there being a pair of aligned holes 30 in the opposite flanges 23, in axial parallelism with the axle shaft 17, in which the shaft portion 27 of each dog D is received. The dogs D are relatively reversed endwise so that the arm 28 of each dog hangs pendulously adjacent its respective carriage wheel 18 with the terminal lug 29 thereon under-reaching the lower rear quarter of said wheel, transversely of its tread 20 and in such proximity relative thereto that it will frictionally engage said tread upon tilting movement of the fulcrum mounting C in direction elevating the dog D of which it is an element. Thus, whichever of the two dogs D is being elevated upon the tilting of the teeter board 10, its terminal lug 29 engages the tread 20 of its respective wheel 18 turning such wheel one step forward. The other dog D, being lowered at the same time, is ineffective and merely returns to depressed starting position preparatory to the effective elevation thereof, in its turn, upon the reverse tilting of the teeter board 10.

While two carriage wheels are preferred, the present construction may be devoid of one of the two wheels in the interest of economy. In such case, the carriage A with a single wheel will be held erect by the spindle 25 which depends from the sleeve 26 on the carriage shaft 17 and which turns in the post 13. Employing a single carriage wheel, only one dog D is required and it will cause the carriage A to be turned one step every other tilting throw of the teeter-board 10.

Applicant's carriage wheels 18, in effect, are alternately locked and made fast relative to the teetering structure in axial coincidence with the axis of such teetering structure or substantially so, whereby substantially the full leverage of said teetering structure may be exerted against each carriage wheel for turning the same. This effect in so locking or tying the teetering structure to a carriage wheel is accomplished in the selection and arrangement of parts, wherein the wheel-engaging member of the dog, upon tilting movement of the teetering structure in one direction, engages and grips the wheel tread at the periphery thereof. The locality of engagement of said wheel-engaging member with the wheel tread lies in a plane which is offset from the axis of the wheels and which intersects said wheels and the pivotal connection between the teetering structure and the dog of which said member is an element. This relationship of parts is clearly seen in the illustrated embodiment of the invention, wherein each dog D is shown as being pendulously hung from the fulcrum mounting C to one side of the axle shaft 17 at a lesser distance therefrom than the radius of a carriage wheel.

From the foregoing it, will be readily appreciated that the present invention is one of markedly simple, durable and inexpensive construction, and that it can be used by children for their enjoyment and delight in producing automatically the effect of a merry-go-round in combination with the seesaw action of a teeter board.

Changes in the specific form of the invention, as herein described, may be made within the scope of what is claimed without departing from the spirit of the invention.

Having described the invention, what is claimed as new and desired to be protected by Letters Patent is:

1. In a self-turning teeter-totter, a carriage consisting of an axle shaft and a pair of supporting wheels revolubly mounted thereon, said wheels having treads of rubber, a fulcrum mounting fulcrumed on said axle shaft between said wheels, said mounting oppositely abutting said wheels and spacing them apart on said axle shaft, a teeter board intermediately supported on said fulcrum mounting, a platform member upon which the wheels of said carriage ride, carriage grid means guiding the carriage swivelly relative to said platform member and directing the wheels thereof in a circular path on said platform member, said guide means comprising a vertical spindle revoluble in said platform member and a sleeve on said carriage shaft secured to the upper end of said spindle, the ends of said sleeve oppositely abutting said mounting, a pair of similar crank-shaped dogs, one for each wheel, each dog including a shaft portion, an arm thereon and a terminal lug on said arm, the shaft portion of one dog being mounted on the fulcrum mounting to one side of said axle shaft a lesser distance than the radius of its respective wheel, the shaft portion of the other dog being similarly mounted on said fulcrum mounting to the opposite side of said axle shaft, the shaft portion of each dog pivotally supporting its respective arm pendulously with the lug on said arm underreaching the lower rear quarter of its respective carriage wheel transversely of its tread in near proximity thereto, such lug being adapted to engage frictionally the periphery of the rubber tread of such wheel and cause the turning of such wheel a step forward upon tilting movement of said fulcrum mounting in direction elevating the dog.

2. In a self-turning teeter-totter, a carriage including an axle shaft, a pair of supporting wheels thereon having treads of frictional material, a fulcrum mounting fulcrumed on said axle shaft between said wheels, a teeter-board intermediately supported on said fulcrum mounting, a platform member upon which the wheels of said carriage ride, means guiding the carriage for movement swivelly with respect to said platform member with the wheels of the carriage running in a circular path on said platform member, a pair of dogs, one for each wheel, each dog including an arm and a terminal lug thereon, the arms of said dogs being pendulously hung from the fulcrum mounting at opposite sides of said axle shaft and, in the case of each arm, at a lesser distance from said axle shaft than the radius of its respective carriage wheel with the lug on the arm underreaching the lower rear quarter of such wheel transversely of its tread in near proximity thereto, each lug being adapted to engage the periphery of its respective wheel tread and cause the turning of its wheel a step forward upon tilting movement of said fulcrum mounting in direction elevating the dog.

3. In a self-turning teeter-totter, a carriage having a pair of supporting wheels revoluble about a common horizontal axis, a fulcrum mounting tiltably mounted on said carriage and tiltable about the axis of said wheels, a teeter-board supported on said fulcrum mounting, said carriage being rotatable swivelly about a vertical axis with the supporting wheels thereof running in a circular path, driving means for the supporting wheels interposed between the fulcrum mounting and said wheels, said means imparting movement from the fulcrum mounting, upon alternate tilting thereof, to the wheels, alternately, turning and rolling the same forward step-by-step along the circular path thereof, said driving means comprising a pair of dogs, one for each wheel, each dog including an arm and a terminal lug thereon, the arms of said dogs being pivoted to the fulcrum mounting at opposite sides of the axis of said wheels and, in the case of each arm, at a lesser distance from said axis of said wheels than the radius of its respective wheel with the lug on the arm transversely disposed relative to the tread of such wheel in near proximity thereto, the lug of each dog engaging the periphery of the tread of its respective wheel and turning such wheel a step forward upon tilting movement of said fulcrum mounting in one direction.

4. In a self-turning teeter-totter, a carriage having a pair of supporting wheels revoluble about a horizontal axis, a fulcrum mounting tiltably mounted on said carriage and tiltable about the axis of said wheels, a teeter-board supported on said fulcrum mounting, said carriage being rotatable swivelly about a vertical axis with the supporting wheels thereof running in a circular path, driving means for the supporting wheels interposed between the fulcrum mounting and said wheels, said means imparting movement from the fulcrum mounting, upon alternate tilting thereof, to the wheels, alternately, turning and rolling the same forward step-by-step along the circular path thereof, said driving means comprising a pair of dogs, one for each wheel, each dog including an arm and a terminal lug thereon, the arms of said dogs being pivoted to the fulcrum mounting and pendulously hung therefrom at opposite sides of the axis of said wheels and, as to each dog, at a locality to one side of the axis of said wheels a lesser distance than the radius of its respective wheel with the lug on the arm underreaching the lower rear quarter of such wheel transversely of its tread in near proximity thereto, the lug of each dog engaging the periphery of the tread of its respective wheel and turning it a step forward upon tilting movement of said fulcrum mounting in direction elevating the dog.

References Cited in the file of this patent

UNITED STATES PATENTS

| 715,321 | Unkefer et al. | Dec. 9, 1902 |
| 1,426,082 | Jacobs et al. | Aug. 15, 1922 |
| 2,605,585 | Sebel | Aug. 5, 1952 |

FOREIGN PATENTS

| 1,411 | Australia | 1926 |